United States Patent
Lemler et al.

(10) Patent No.: US 6,546,420 B1
(45) Date of Patent: Apr. 8, 2003

(54) AGGREGATING INFORMATION ABOUT NETWORK MESSAGE FLOWS

(75) Inventors: Christian Lemler, Fremont, CA (US); Jiang Jiang, Los Altos Hills, CA (US); Tony Tuan Nguyen, San Jose, CA (US); Wai-Ling Hew, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/282,518

(22) Filed: Mar. 31, 1999

(51) Int. Cl.[7] ................... G06F 15/173; G06F 15/16
(52) U.S. Cl. ..................... 709/224; 709/232
(58) Field of Search ................ 709/223, 224, 709/232, 233; 370/232, 235, 252, 253

(56) References Cited

U.S. PATENT DOCUMENTS

| | | | | |
|---|---|---|---|---|
| 5,757,895 A | * | 5/1998 | Aridas et al. | 379/136 |
| 5,854,834 A | * | 12/1998 | Gottlieb et al. | 379/114.04 |
| 6,002,753 A | * | 12/1999 | Morrison et al. | 379/112.01 |
| 6,018,619 A | * | 1/2000 | Allard et al. | 709/224 |
| 6,085,244 A | * | 7/2000 | Wookey | 709/224 |
| 6,308,148 B1 | * | 10/2001 | Bruins et al. | 703/27 |

OTHER PUBLICATIONS

Cheriton, D.R. et al. "Network measurement of the VMTP request–response protocol in the V distributed system", ACM SIGMETRICS, ISBN: 0-89791-225-X, pp. 216–225, 1987.*

Signal, S.K. et al. "Using projection aggregations to support scalability in distributed simulation", IEEE COnf. on Distributed Computing Systems, ISBN: 0-8186-7399-0, pp. 196–206, May 1996.*

Waldbusser, S. "Remote Network Monitoring Management Information Base Ver. 2 using SMlv2", RFC: 2021, pp. 1–130, Jan. 1997.*

* cited by examiner

*Primary Examiner*—Zarni Maung
*Assistant Examiner*—Jason D. Cardone
(74) *Attorney, Agent, or Firm*—Hickman Palermo Truong & Becker LLP

(57) ABSTRACT

A method and apparatus are provided for aggregating flow records representing network flow. Specifically, flow records may be organized according to whether they are request records, response records associated with the request records, or flow records associated with neither category. A request record may represent a network flow to a particular device of a particular network flow type, for example, network flow to a standard port. The request records and flow records are then aggregated.

20 Claims, 9 Drawing Sheets

Table 610

| | Source Dev | Dest Dev | Source Port | Dest Port | Internal List |
|---|---|---|---|---|---|
| 1- | A | B | 1171 | 80 | request list 252 |
| 2- | B | A | 2271 | 1171 | response list 254 |
| 3- | A | B | 1172 | 80 | request list 252 |
| 4- | B | A | 4014 | 1172 | response list 254 |
| 5- | A | B | 1174 | 80 | request list 252 |
| 6- | B | A | 4015 | 1174 | response list 254 |
| 7- | B | A | 3193 | 7 | request list 252 |
| 8- | A | B | 2171 | 9100 | unknown list 256 |
| 9- | B | A | 80 | 2171 | unknown list 256 |
| 10- | A | B | 3000 | 9100 | unknown list 256 |
| 11- | B | A | 80 | 2000 | unknown list 256 |

Table 620

| | Source Dev | Dest Dev | Source Port | Dest Port | Internal List |
|---|---|---|---|---|---|
| 1- | A | B | | 80 | request list 252 |
| 2- | B | A | | 80 | response list 254 |
| 7- | B | A | | 7 | request list 252 |
| 8- | A | B | 2171 | 9100 | unknown list 256 |
| 9- | B | A | 80 | 2177 | unknown list 256 |
| 10- | A | B | 3000 | 9100 | unknown list 256 |
| 11- | B | A | 80 | 2000 | unknown list 256 |

Table 630

| | Source Dev | Dest Dev | Source Port | Dest Port | Internal List |
|---|---|---|---|---|---|
| 1- | A | B | | 80 | request list 252 |
| 2- | B | A | | 80 | response list 254 |
| 7- | B | A | | 7 | request list 252 |
| 8- | A | B | 2171 | 9100 | unknown list 256 |
| 9- | B | A | 80 | 2177 | unknown list 256 |
| 10- | A | B | 3000 | 9100 | unknown list 256 |

Fig. 6

AGGREGATING INFORMATION ABOUT NETWORK MESSAGE FLOWS

FIELD OF THE INVENTION

This invention generally relates to data processing in the field of networks. The present invention relates more specifically to the aggregation of information about message flows.

BACKGROUND OF THE INVENTION

In computer networks, it is desirable to collect information about how a network is used. The information can be used by network administrators, routing devices, service providers, and users. This information may describe how network messages or packets are transmitted in the network—their source or destination, number, frequency, size, protocol type, priority, or other administrative information such as security classifications or accounting information. This information may be aggregated by a variety of categories—for the entire network or subnetworks thereof, for groups of sources or destinations, or for particular types of packets (such as particular size, protocol type, priority, security classifications, or accounting information). A stream of packets passing through the network is known as a "flow."

However, in many computer networks, the number of packets transmitted in the network, is large, and thus the amount of information to be collected is extremely large. Often, the resources needed to process this information, such as static storage and processor power, are much larger than are available or practical.

A first known method for collecting information about use of the network is to couple a monitoring processor to a link in the network, and to monitor traffic which passes through that link. For example, the monitoring processor could be coupled to a local-area network (LAN) or coupled to a router, and could monitor traffic input to or output from that router using that LAN. A protocol known as "RMON" (remote monitoring) is known for transmitting messages relating to monitoring information between the monitoring processor and the router. However, this known method is subject to several significant drawbacks. For example, the number of packets input to and output from the router usually greatly exceeds the capability of the monitoring processor to collect and process information about packets. Also, that the monitoring processor may be able to collect and process information only about packets which pass through that particular link.

A second known method for collecting information about use of the network is to couple the monitoring processor to the router using protocols at layer 3 of the OSI model, such as using the Internet Protocol ("IP") protocol to communicate between the monitoring processor and the router. The RMON protocol may also be used to transmit messages relating to monitoring information between the monitoring processor and the router in this configuration. However, this second method also has drawbacks. For example, the monitoring processor may be unable to collect information from the router in sufficient detail, or if information is available in sufficient detail, that information may greatly exceed the capability of the monitoring processor to collect and process it.

In a third known method, a router provides the aggregated information to one or more filters at an output port. Each filter selects only a subset of the total set of flows. The filters may be combined to create compound filters and may be coupled to aggregators, which further aggregate flow data and may store flow data for use by application programs. The filters may select information using a variety of criteria, including: (1) ranges of addresses for source and destination: (2) information about packets in the flow, such as the number and frequency of the packets in the flow, the size of the packets in the flow (total size and distribution): (3) the protocol used for the flow, such as for example whether the flow uses an electronic mail protocol, a file transfer protocol, a hypertext transfer protocol ("HTTP"), a real-time audio-visual data transmission protocol, or some other protocol: (4) other administrative criteria which may be pertinent to the flow, such as for example the time of initiation or duration of the flow. However, even in the third method, the quantity of information generated may exceed greatly the resources available to handle it. In addition, much of the information captured may be incomplete, have little informational value, or may not be captured at all.

For example, in a network that conforms to Internet protocols, a request for data may be sent using HTTP from a source device A at port 2000, to a destination device B at port 80, the well known port for receiving HTTP requests. Often, but not always, a host receiving an HTTP request at port 80 responds by transmitting data from port 80 to the requestor. However, to reduce contention for port 80, a host may employ "port switching," and thus may respond from a different port.

In this example, assume that device B sends the requested data to device A at port 2000, but sends from port 2999 instead of port 80. To capture HTTP traffic related to device A, a filter on the router has been configured to capture and aggregate traffic from source device A to a destination device at port 80, and from source device B from source port 80. Thus, the filter fails to capture the response from device B from port 2999. While the filter may be configured to capture traffic between an expanded set of ports that includes port 2999, the resulting additional data captured may not be necessarily related to HTTP traffic, or may be even too large in quantity to be handled by available resources.

Thus, there is a need for methods, mechanisms, or systems whereby the vast amount of flow data produced by network elements may be condensed, organized and made useful.

Accordingly, it would be desirable to provide a method and system for monitoring information about network usage, while avoiding overwhelming the limited resources available to process and store the information.

There is a particular need for a mechanism of aggregating information about related network traffic at a sufficient level of detail.

SUMMARY OF THE INVENTION

The foregoing needs, and other needs that will become apparent from the following description, are achieved by the present invention, in one aspect, through the aggregation of related flow records. Specifically, flow records may be organized according to whether they are request records, response records associated with the request records, or flow records associated with neither category. A request record may represent a network flow to a particular device of a particular network flow type, for example, network flow to a standard port. The request records and flow records are then be aggregated.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6 shows tables depicting flow records used to illustrate techniques for aggregation.

DETAILED DESCRIPTION OF THE PREFERRED EMBODIMENT

Figure 1A:
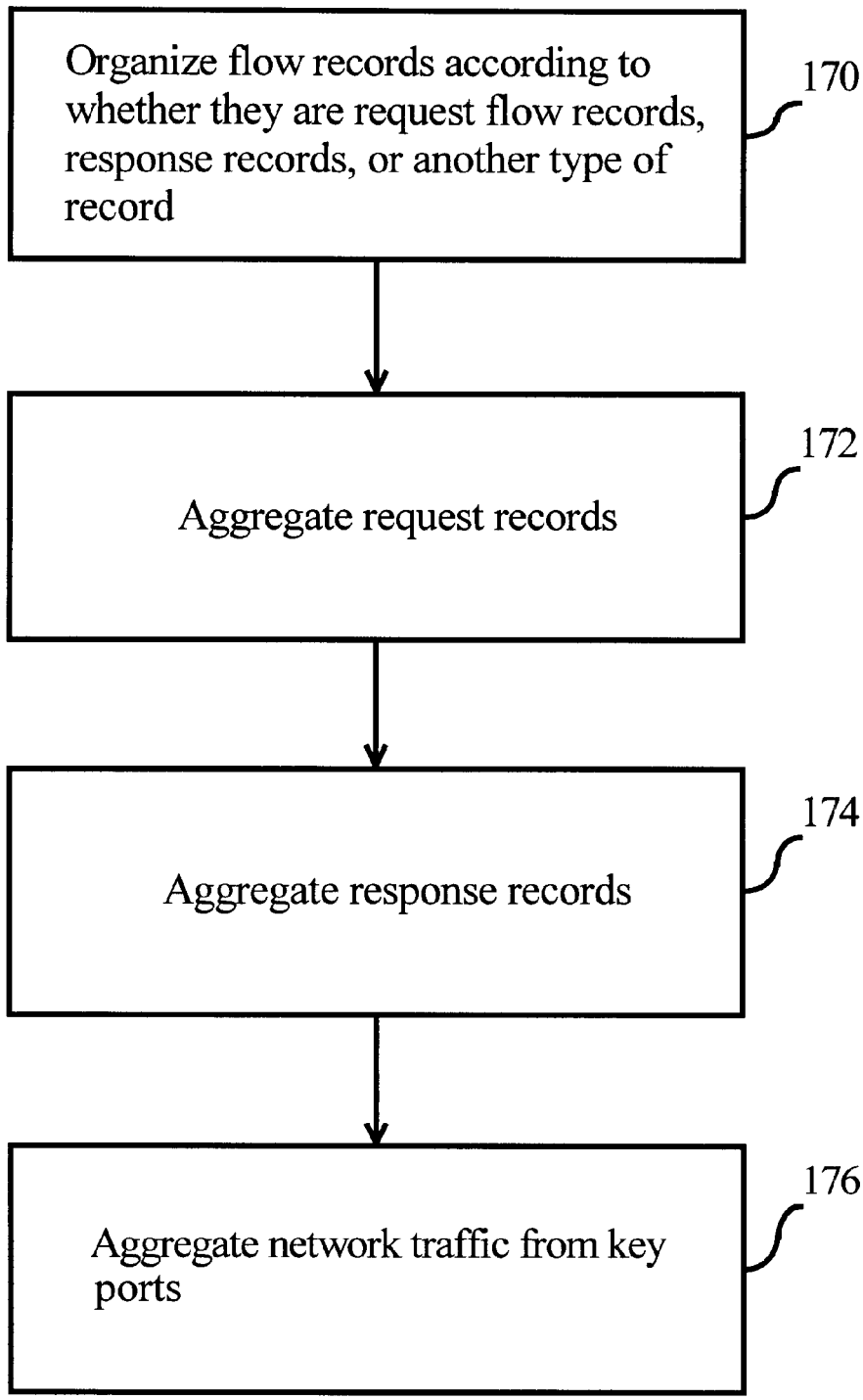
FIG. 1A is a high level flow chart depicting a technique for aggregating related flow records.

A method and apparatus for aggregating network information is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

TERMS AND DEFINITIONS

In this document, certain specific technical terms or descriptive terms have been found useful and convenient, and exemplary meanings are provided in this section. Such terms are not limited to these definitions, however, and include all equivalent structures and functions. A network device is a device coupled to a network to which network traffic may be directed and from which network traffic may originate. Typically, a network device is associated with a temporary or permanent IP address. Examples of network devices are general purpose computers, printers, routers, switches, etc.

A network flow is a transmission of a quantity of data over a network from a first network device ("source device") to another network device ("destination device").

A flow record is a record of data generated by a network device that contains information about a network flow. Table A shows an exemplary flow record field format used to illustrate an embodiment.

TABLE A

FLOW RECORD FORMAT

| Field name | Field Description |
| --- | --- |
| Source Device Field | IP address of the source device |
| Destination Device Field | IP address of the destination device |

TABLE A-continued

FLOW RECORD FORMAT

| Field name | Field Description |
| --- | --- |
| Source Port Field | Source port number |
| Destination Port Field | Destination port number |
| Protocol Field | Protocol value as defined by the |
| Type of Service Field | Type of service |
| #PACKETS | Number of packets in net flow |
| #BYTES | Number of bytes in net flow |
| #FLOWS | Number of net flows which are reflected by this record |
| EARLIESTTIME | Earliest time of the net flows reflected by record |
| LATESTTIME | Latest time of the net flows reflected by record |
| ACTIVETIME | Duration between EARLIESTTIME AND LATESTTIME |

Aggregation or aggregating refers to creating and storing a flow record ("aggregated record") that contains data derived from multiple flow records. Typically, aggregation is performed to improve efficiency of storage while retaining or enhancing the information value of the flow record. The records from which the generated record is derived are referred to as being "aggregated". Table B shows two flow records used to illustrate aggregation.

TABLE B

EXAMPLE AGGREGATION

| Field name | Record B1 | Record B2 | Aggregated Record B |
| --- | --- | --- | --- |
| Source Device Field | A | A | A |
| Destination Device Field | B | B | B |
| Source Port Field | 3000 | 2645 | 3000 |
| Destination Port Field | 80 | 80 | 80 |
| Protocol Field | TCP | TCP | TCP |
| Type of Service Field | 5 | 5 | 5 |
| #PACKETS | 10 | 12 | 22 |
| #BYTES | 1024 | 2048 | 3072 |
| #FLOWS | 2 | 1 | 3 |
| EARLIESTTIME | 0700:59:58:001 | 0700:59:59:001 | 0700:59:58:001 |
| LATESTTIME | 0700:59:58:002 | 0700:59:59:002 | 0700:59:59:002 |
| ACTIVETIME | 1 | 1 | 1:001 |

Aggregated record B is derived from flow record B1 and flow record B2. The values of the source device field, source port field, the destination device field, the destination port field, the protocol field, and the type of service field of aggregated record B are set to those of record B1 and record B2. The value of #PACKETS field in aggregated record B is the sum of the #PACKETS field in flow records B1 and B2, the value of the #BYTES field in aggregated record B is the sum of the #BYTES field in flow records B1 and B2, the value of the #FLOWS field in aggregated record B is the sum of the #FLOWS field in flow records B1 and B2. The EARLIESTTIME field of aggregated record B reflects the earlier value of the EARLIESTTIME field in records B1 and B2, respectively, and the LATESTTIME field of aggregated record B reflects the latest value of the LATESTTIME fields in records B1 and B2. The value of the ACTIVE TIME field is the difference between the values of the EARLIESTTIME field and the LATESTTIME field in aggregated record B.

After aggregation, some values of the aggregated field may be ambiguous. For example, the SOURCE DEVICE field of aggregated record B is ambiguous because it only applies to some of the net flows represented by aggregated record B. For such fields, it not necessary to store any value in an aggregated record.

An aggregate key is a field used to determine which flow records to aggregate together. The records that satisfy a predetermined relationship between respective aggregate fields are aggregated together. For example, when the aggregate key is the source device field, and the predetermined relationship is equality, then all records with the same value in the source device field are aggregated.

Matching aggregate keys are aggregate keys where the predetermined relationship is equality. For example, when the fields source device, destination device, and destination port serve as aggregate keys, flow records with the same source device, destination device, and port are aggregated.

An aggregated record may be generated in variety of ways. First, a new flow record may be created, or one of the multiple flow records from which the aggregated record is derived may be updated with the aggregated information. Thus, aggregated record B may be a new flow record, or an updated record B1 or B2. After aggregation, one or more multiple records may be deleted, thus saving storage space while saving the information that is desired to retain in the aggregated record.

A request flow is a network flow of particular type of network traffic to a network device sent to the network device for the purpose of the network device servicing the network flow. For example, network flow from a device A at port 1800 to a device B at port 80 represents an HTTP request from device A to device B for the purpose of device B servicing the request by, for example, providing a specified file.

A request record is a flow record representing a request flow.

A response flow is network traffic sent by a network device in response to receiving a request flow. In the example immediately above, in response to receiving the request flow from device A, device B sends a network flow that includes data for the requested file. A network flow generated in response to another is referred as being "responsive" to other network flow. Thus the network flow from device B to A is responsive to the network flow from A to B.

A response record is a flow record representing a response flow.

A key port is a port to which network traffic of a particular type may be directed, or from which network traffic may originate. Often it is useful to provide information organized according to a particular type of traffic, and thus, according to a particular key port. For example, it is possible to organize network records according to whether it is the HTTP type by aggregating flows based on matching aggregate keys. For example, the records may be aggregated by these fields: source device, destination device, destination port, where the destination port matches the key port 80. Other examples of key ports that may be established through the use of ports are defined in RFC 1700.

FUNCTIONAL OVERVIEW

Space savings in storage devices are achieved through the aggregation of related flow records. Specifically, flow records are aggregated according to the following.

(1) Request records representing net flow to key ports from a particular source device to a particular destination device are aggregated together. Specifically, flow records where the matching aggregation keys include the fields source device, destination device, and destination port, and where the value of the destination port matches a key port, are aggregated together. For purposes of exposition, the techniques for aggregation described herein do not use the protocol field as an aggregation key. However, the techniques described may be adapted to use the protocol field or other fields in a flow record as aggregation fields.

(2) Response records that are each associated with the request flow records are aggregated together.

(3) Flow records representing network flow from key ports to a particular source device and to a particular destination device are aggregated together.

(4) Flow records representing network traffic between ports which are not key ports are aggregated together.

FIG. 1A is a high level flow chart that outlines techniques described hereafter for aggregating related flow records. At step 170, flow records are organized according to whether they are request records, response records associated with the request records, or flow records associated with neither category. At step 172, request records are aggregated. At step 174, the response records are aggregated. At step 176, flow records that represent network traffic from key ports are aggregated.

EXEMPLARY NETWORK ARCHITECTURE

Figure 1B:
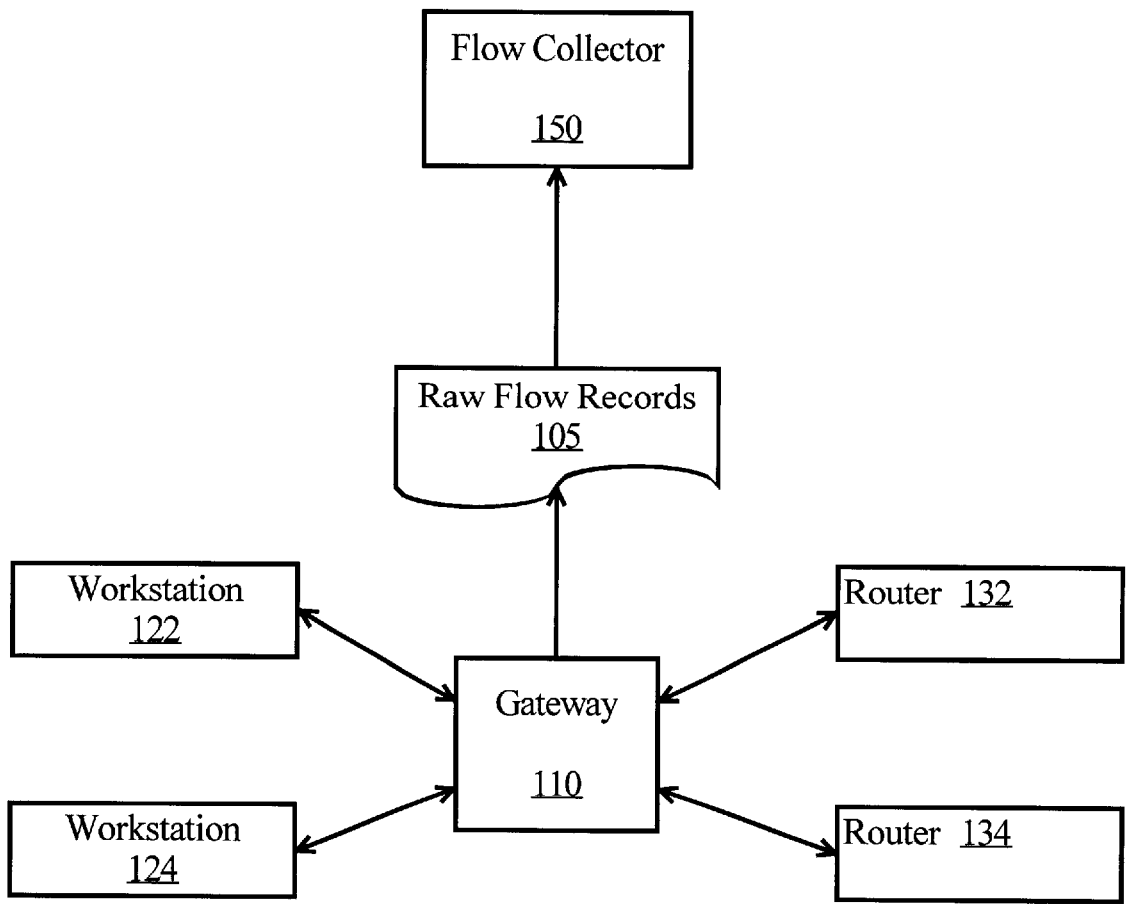
FIG. 1B is a block diagram depicting an exemplary network.

FIG. 1B depicts an exemplary network architecture 101 upon which an embodiment may be implemented.

Gateway 110 interconnects router 132, router 134, workstation 122, and workstation 124. Workstations 122, and 124 may be end stations or nodes such as personal computers, graphics workstations, printers, etc. Routers 132, and 134 may be routing devices such as routers, switches, bridges, etc.

Flow collector 150 collects and aggregates information about network flow through Gateway 110. A flow collector is a mechanism that collects and aggregates information about network flow through a particular switching mechanism, such as a set of routers, a gateway, or a bridge. Flow collector 150 may reside on a separate computer system coupled to the switching mechanism via a network, or may be an integrated component on the same computer system as that of the switching mechanism. For example, flow collector 150 may be a set of processes running on the same computer as gateway 110. Flow collector 150 receives raw flow records 105 from gateway 110. Raw flow records are flow records received from a switching mechanism.

EXEMPLARY FLOW COLLECTOR

Figure 2:
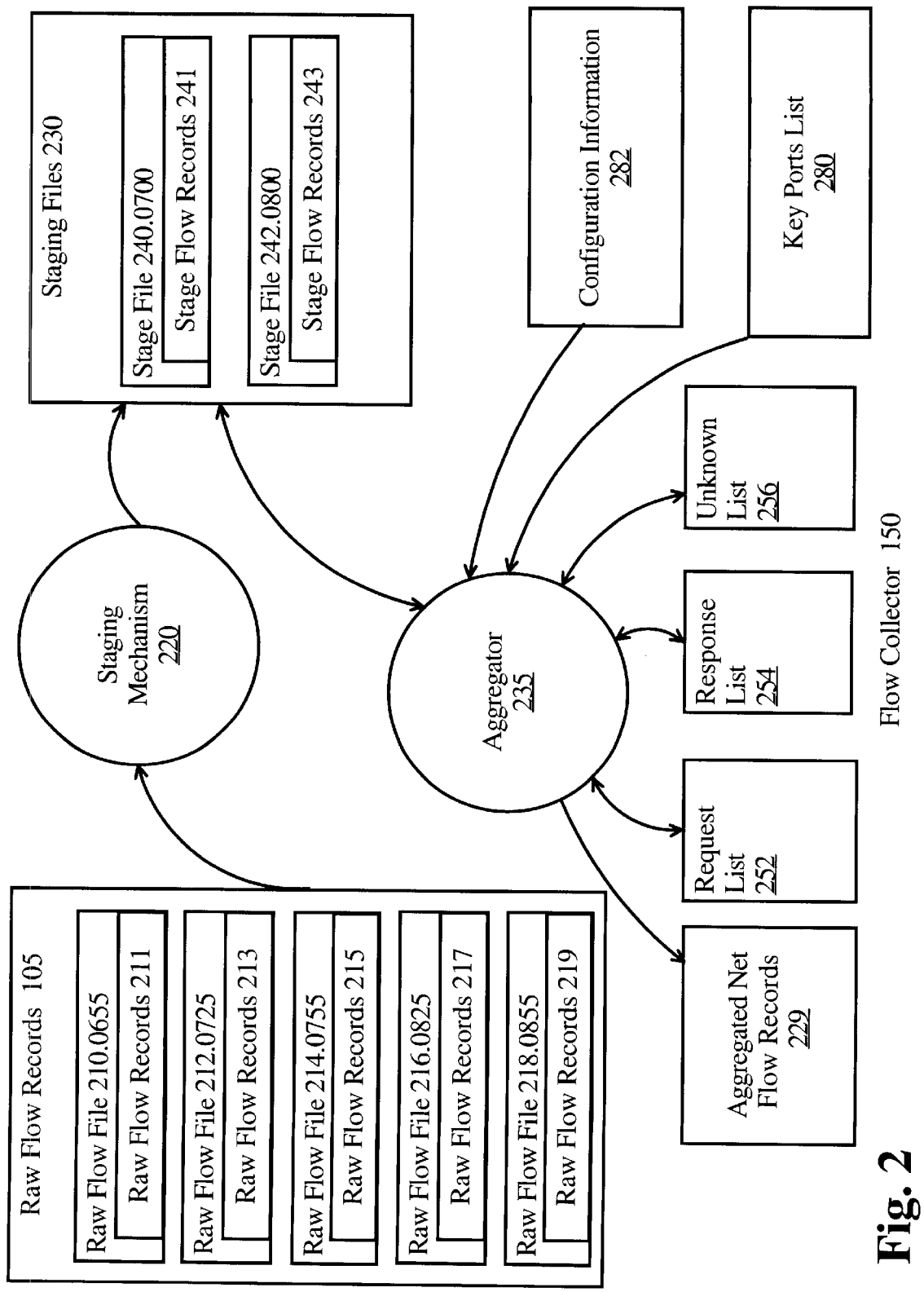
FIG. 2 is a block diagram depicting an exemplary flow collector.

FIG. 2 shows further details of the structure of one embodiment of flow collector 150. Referring to FIG. 2, flow collector 150 includes raw flow records 105, staging mechanism 220, staging files 230, configuration information 282, key port list 280, and aggregated flow records 229.

Raw flow records 105 contain raw flow information that is sent to flow collector 150 by gateway 110. Specifically, raw flow records may include flow records sent by gateway 110 in raw flow files 210.0655, 212.0725, 214.0755, 216.0825, 218.0855. Raw flow files 210.0655, 212.0725, 214.0755, 216.0825 and 218.0855 contain raw flow records 211, 213, 215, 217 and 219, respectively. Each of these files contain raw flow records that cover a fixed length period of time. The beginning of the time period may be indicated by the extension of the file. For purposes of illustration, in FIG. 2 the reference numerals used for the raw flow files indicate the start time. For example, decimal or terminal portion of reference numeral 210.0655, that is "0655", indicates that the flow records contained therein were recorded for the half hour period beginning at time 0655. Thus, by comparing the file extensions of successive raw flow files, the period of time to which a raw flow file applies may be determined.

Staging mechanism 220 collects flow records in raw flow files and groups them as stage flow records in staging files 230. Staging mechanism 220 may group flow records from raw flow files according to user defined times and intervals, which are stored in configuration information 282. Staging files 230 may include stage file 240.0700 and stage file 242.0800. Stage files 240.0700 and 242.0800 are each associated with a time interval: stage file 240.0700 is associated with an hour interval beginning at 0700, and 242.0800 is associated with a time interval of an hour beginning at 0800.

Staging mechanism 220 groups flow records in raw flow files associated with a period that begins within the time interval associated with a staging file. Thus, staging mechanism 220 receives and groups flow records 213 in raw flow file 212.0725 and flow records 215 in file 214.0755 into stage file 240.0700, and flow records 217 in file 216.0825 and flow records 219 in file 218.0855 into stage file 242.0800.

Aggregator 235 aggregates flow records received from staging files 230 into aggregated flow records 229 at time intervals defined by configuration information 282. Assume for purposes of illustration that data in configuration information 282 specifies that Aggregator 235 aggregates flow records in staging files 230 at two hour intervals beginning at 0700 every day. Thus, aggregator 235 aggregates flow records in stage file 240.0700 and stage file 242.0800 into aggregated flow records 229.

Request list 252, response list 254, and unknown list 256 are temporary lists of information used by aggregator 235 when aggregating flow records from staging files 230. Request list 252 contains flow records that have been established as request flows. Response list 254 contains response records associated with request flows represented by request list 252. Unknown list 256 contains flow records representing network flows that are not established as request flows or responses to request flows. The manner in which request list 252, response list 254 and unknown list 256 are used is described hereafter.

Key ports list 280 is a list of key ports. As mentioned earlier, a key port is a port to which network traffic of a particular type may be directed, or from which network traffic may originate. Key ports list 280 may be user defined, and is used to establish what ports are the key ports.

ESTABLISHING REQUESTS AND RESPONSES

Figure 3:
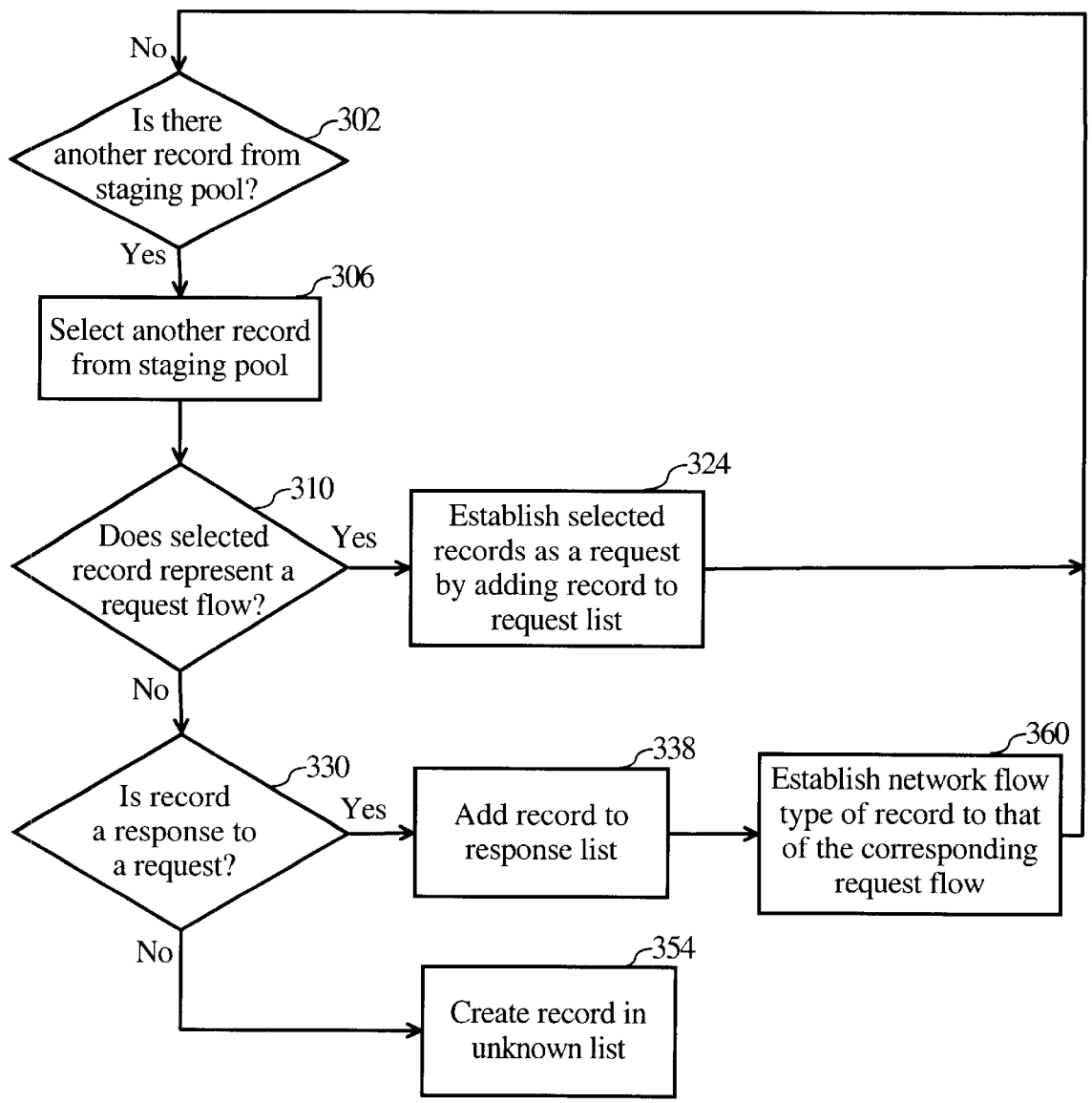
FIG. 3 is flow chart showing a process for organizing flow records into request records and response records, and records which fall into neither category.

Before aggregating records representing flow responses between particular pairs of network devices of a particular network traffic type and their responses, which flow records are request flows and which are response flows associated those request flows must be determined. FIG. 3 shows steps that may be performed to make this determination. The steps are performed by Aggregator 235 as part of the process of aggregating flow records in staging files 230 into aggregated flow records 229 at specified time intervals. The set of flow records in the staging files that fall within a particular time interval is referred to as the "staging pool." Assume for purposes of illustration that the interval for which records in the staging pool are being aggregated is a two hour interval beginning at 0700. Thus, the stage flow records 241 and 243 in stage files 240.0700 and 242.0800 comprise the staging pool used to illustrate the blocks of FIG. 3.

Referring to FIG. 3, at block 302, it is determined whether there is an unprocessed flow record in the staging pool. For the purposes of the steps shown in FIG. 3, an unprocessed flow record is a flow record in the staging pool that has not been selected at block 306. If the determination is that there are no unprocessed records, then execution of the blocks ceases. Otherwise, control flows to block 306. At block 306, an unprocessed record from the staging pool is selected.

At block 310, it is determined whether the selected flow record is a request record. This determination may be made by determining whether the destination port field of the selected flow record specifies a port in key port list 280. If the destination port field specifies a key port in the key port list 280, then control flows to block 324.

For example, a flow record RQT specifies a source device A, a destination device B, a source port of "1176", and a destination port of "80". Because the destination port is a key port in key port list 280, the record represents a request flow. Therefore, control flows to block 324.

At block 324, the selected record is added to request list 252. Control returns to block 302.

If, on the other hand, the destination port field does not specify a key port in key port list 280, then control flows to block 330. At block 330, it is determined whether or not the selected record is part of a response flow to a request flow represented by request list 252. This determination may be made by determining whether several conditions are satisfied:

(1) the source device and destination device field of the selected record match respectively the destination device and source device field of a flow record in request list 252, and (2) the destination port field of the selected record matches the source port field of the flow record.

If conditions (1) and (2) are satisfied, then control flows to block 338, where the selected flow record is established as a response flow by adding the selected flow record to the response list 254. The flow record that satisfies conditions (1) and (2) with respect to the selected record is referred to as the matching response record. If, on the other hand, conditions (1) and (2) are not satisfied, control flows to block 354. At block 354, the selected flow record is added to the unknown list.

Referring again to the current example involving flow record RQT, assume another flow record RSP specifies a source device B, a destination device A, a source port of "3002", and a destination port of "1176". Because the source device field of flow record RQT matches the destination device field of flow record RSP, the destination device field of flow record RQT matches the source device field of flow record RSP, and the source port field of flow record RQT matches the destination port field of flow record RSP, the determination at block 330 is that flow record RQT is a response to flow record RSP. Therefore, control flows to block 360.

At block 360, the traffic type associated with the selected record is established as that of the response flow corresponding to the selected record. In the current example, the destination port field of flow record RSP is set to "80", which is the destination port field of the corresponding request record RQT, thus establishing flow record RSP as the type of traffic associated with key port "80", that is, HTTP traffic.

If the protocol field is to be used as an aggregation field, then the selected record should satisfy an additional condition in block 310. Specifically, the protocol field of the selected record and a request record in request list 252 should match.

RESPONSES PROCESSED BEFORE REQUESTS

It is possible that after a flow record is added to the unknown list 256, a matching request record is processed by the blocks in FIG. 3. To account for such a possibility, after the blocks in FIG. 3 are performed, the unknown list 256 is scanned to find whether any records have corresponding matching request records in request list 252. When a matching request record is found for a flow record in unknown list 256, the flow record is moved to the response list 254.

AGGREGATING REQUESTS

After request list 252 is formed by the foregoing process, request list 252 may contain a set of request records representing network flows to a particular destination device and port from a source device, but different source ports. For example, a flow record RQT-1 and RQT-2 specify a source device A, a destination device B, and a destination port of 80. However, due to port switching by device A, RQT-1 specifies a source port of 1987, while RQT-2 specifies a source port of 2952. RQT-1 and RQT-2 may be aggregated, yielding more complete information about HTTP traffic between network device A and B, while reducing storage needed to store the information.

Figure 4A:
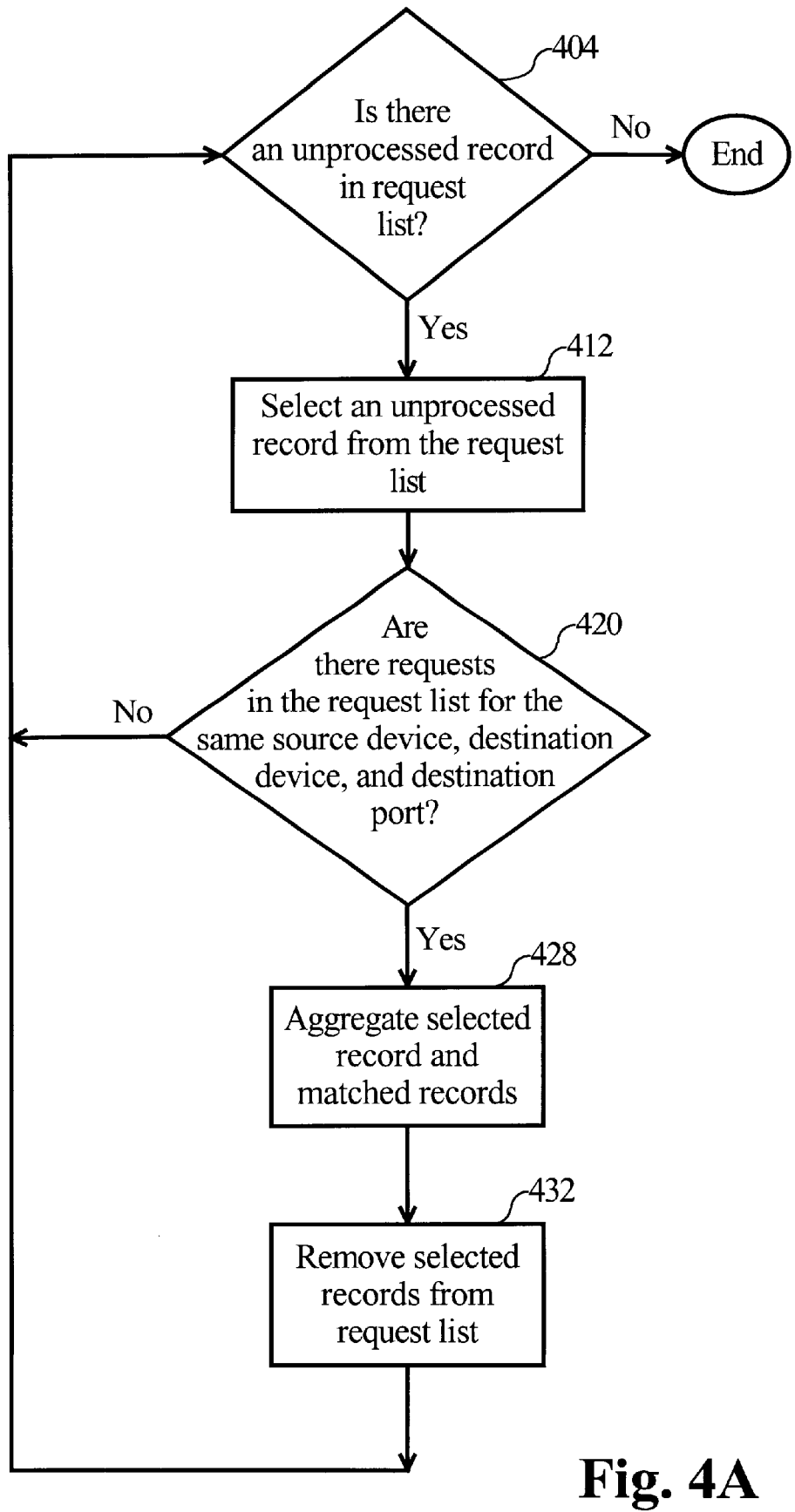
FIG. 4A is a flow chart showing a process performed to aggregate request records.

FIG. 4A shows steps of a process for aggregating such flow records. In addition to these types of flow records, flow records that represent network traffic between the same source device and port and destination device and port are aggregated, yielding further storage savings. Thus, the process provides a mechanism for aggregation based on matching aggregation keys source device, destination device, and destination port.

Referring to FIG. 4A, it is determined whether there is an unprocessed record in request list 252. If there is no unprocessed record, execution of the steps ceases. Otherwise, execution proceeds to block 412, where an unprocessed record from request list 252 is selected.

At block 420, it is determined whether there are other flow records in request list 252 with identical values in the matching aggregation fields or keys, namely, source device, source port, and destination device. If there are other flow records in request list 252 with these matching fields, then control goes to block 428. Otherwise, control flows to block 404. If there are other aggregation fields being used for block 420, then these fields should match as well.

At block 428, the selected field and the matching flow records in request list 252 are aggregated. Specifically, the fields #packets, #bytes, and #flows of the selected record are added to fields #packets, #bytes, and #flows of the matched request record. The field EARLIESTTIME is set to the earlier of EARLIESTTIME of the selected record and the matching record. The LATESTTIME field is set to the later of the LATESTTIME field of the selected record and the matching flow record. Finally, field ACTIVE TIME of the matched record is set to the difference of EARLIESTTIME and LATESTTIME of the matched record.

At block 432, the selected record is removed from the request list. Control returns to block 404.

AGGREGATING RESPONSES

As a result of setting the destination port field to a key port in a set of response records in response list 254, the records may represent network flows from a particular destination device and key port to a source device, but different source ports. For example, a response record RSP-3 and RSP-4 specify a source device B, a destination device A, and a destination port of 80. However, RSP-3 specifies a source port of 1987 while RSP-4 specifies a source port of 2952. Typically, tracking information like that contained in RSP-3 and RSP-4 by source port is not meaningful because the source ports for requests are typically assigned arbitrarily. Thus, by aggregating RSP-3 and RSP-4 according to destination device and destination port and source device, more meaningful summary information about HTTP traffic between network device A and B is yielded.

Figure 4B:
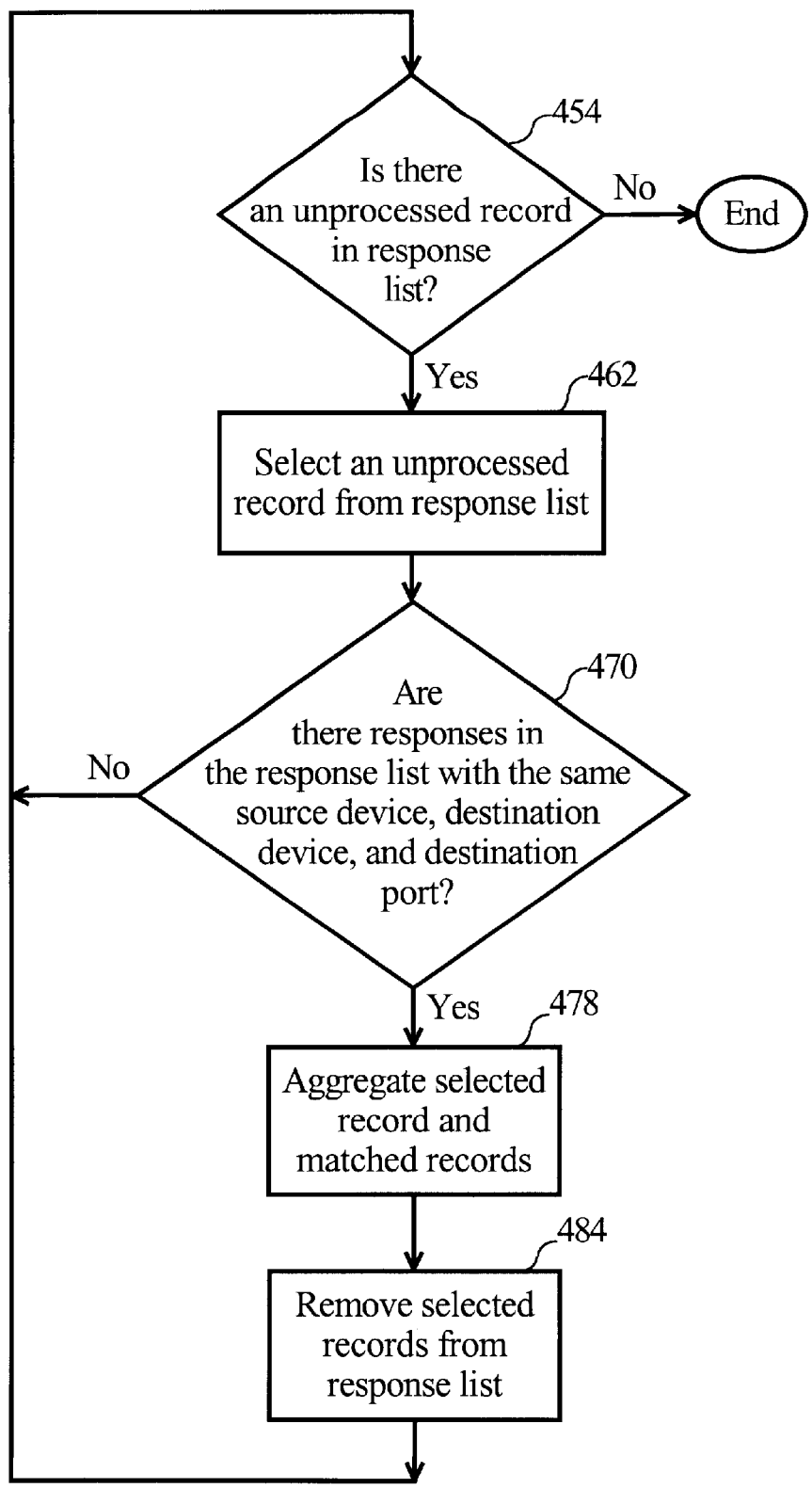
FIG. 4B is a flow chart showing a process performed to aggregate response records.

FIG. 4B shows steps of a process for aggregating such flow records. In addition to these types of flow records, flow records that represent network traffic between the same source device and port and destination device and port are aggregated, yielding further storage savings. Thus, the process provides a mechanism for aggregation based on matching aggregation keys that include the fields source device, destination device, and destination port.

Referring to FIG. 4B, at block 454, it is determined whether there is an unprocessed record in response list 254. If there is no unprocessed record, execution of the steps ceases. Otherwise, execution of the steps proceeds to block 462, where an unprocessed record from response list 254 is selected.

At block 470, it is determined whether there are other flow records in response list 254 that have a matching source device field, destination device field, destination port field. If there are other flow records in response list 254 with these matching fields, then control proceeds to block 478. Otherwise, control flows to block 454. If there are other aggregation fields being used for block 470, then these fields should match as well.

At block 478, the selected field and the matching flow records in response list 254 are aggregated. Specifically, the fields #packets, #bytes, and #flows of the selected record are added to fields #packets, #bytes, and #flows of the matched response records. The field EARLIESTTIME is set to the earlier of EARLIESTTIME of the selected record and the matching record. The LATESTTIME field is set to the later of the LATESTTIME field of the selected record and the matching flow records. Finally, field ACTIVE TIME of the matched records is set to the difference of EARLIESTTIME and LATESTTIME of the matched records.

At block 484, the selected flow record is removed for the response list 254. Control returns to block 454.

AGGREGATING TRAFFIC FROM KNOWN PORTS

After performing the blocks in FIG. 3 and transferring flow records in the unknown list with matching response records to response list 254, the unknown list may include flow records representing traffic from a particular source device and key port, to a particular destination device but different destination ports. Because such traffic is often related, it is useful to aggregate traffic from the same key port. For example, a flow record U2 may represent a network flow from device B at port "80" to device A at port "3456", and flow record U2 may represent a network flow from device B at port "80" to device A, but at port "4356". Because traffic to port "80" from the same source device to the same destination device is very likely to be related HTTP traffic, it useful to aggregate flow records representing such traffic.

Figure 5:
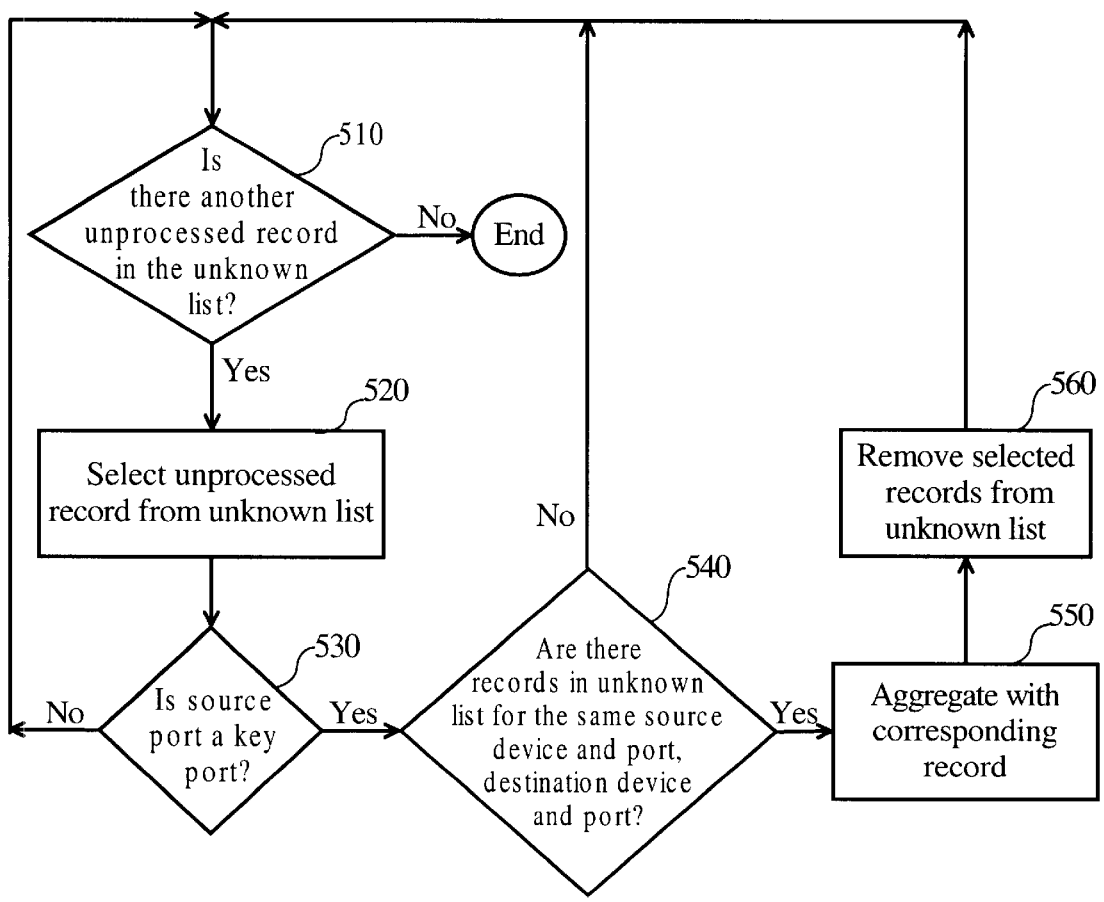
FIG. 5 is a flow chart showing a process performed for aggregating flow records that are not request records or response records.

FIG. 5 shows a process for performing such aggregation. Referring to FIG. 5, at block 510, it is determined whether there is an unprocessed record in the unknown list 256. For purposes of FIG. 5, an unprocessed record is a record in unknown list 256 that has not been selected at block 520 in a particular invocation of the process depicted in FIG. 5. A processed record is a record in unknown list 256 that has been selected at block 520 in a particular invocation of the process depicted in FIG. 5. If there are no unprocessed records in unknown list 256, execution ceases. Otherwise, execution proceeds to block 520.

At block 520, an unprocessed record from unknown list 256 is selected.

At block 530, it is determined whether the source port field in the selected record specifies a key port in key port list 280. If the selected record has a source port field that does not match a source port in the key port list, then control returns to block 510. Otherwise, control flows to block 540.

At block 540, it is determined whether there are processed records in the unknown list with a matching source device field, destination device field, source port field, and destination port field that matches those of the selected record. If there are records in the unknown list with these matching fields, then control flows to block 550. Otherwise, control flows to block 510.

At block 550, the selected record is aggregated with the matching records in the unknown list 256. At block 560, the selected records are removed from the unknown list.

OPERATIONAL EXAMPLE

FIG. 6 shows tables that depict expository flow records that are used to illustrate the blocks shown in FIG. 3. For purposes of exposition, only the source device field, destination device field, source port field, and destination port field of the flow records are shown. Table 610 shows the expository flow records from staging files 230. Column 619 shows which list of request list 252, response list 254, and unknown list 256 a particular flow record is added to after application of the process of FIG. 3. Table 620 shows the expository flow records after application of the blocks shown in FIG. 4A and 4B. Similar to column 619, column 629 shows which list a particular flow record is added to after application of the process in FIG. 4A and 4B. Table 630 shows expository flow records after application of the process shown in FIG. 5. Similar to column 619, column 639 shows which list a particular flow record is added to after application of the process in FIG. 5.

Referring to FIG. 3, at block 302, the determination made is that there is an unprocessed record in staging files 230. At block 306, flow record 1 is selected. At block 310, it is determined that the destination port field specified by flow record 1, port 80, is in key port list 280. Therefore, control flows to block 324. At block 324, record 1 is added to request list 252.

The next record selected is record 2. The destination port field of record 2 specifies that the destination port is port 1171, which is not a key port. Therefore, control flows to block 330. At block 330, it is determined whether the record is a response record to a request in the request list 252. Because the destination device field of flow record 2 matches the source device field of record 1, the source device field of record 2 matches the destination device field of record 1, and the destination port of record 2 matches the source port field of record 1, it is determined that selected record 2 is a response record. Control therefore flows to block 338, where record 2 is added to the response list 254.

At step 360, the destination port field of record 2 is set to "80", the destination port field of record 1.

After record 3 and 5 are selected, at block 310 it is determined that their destination port specifies a key port. Therefore, record 3 and 5 are added to request list 252.

After record 4 is selected, at block 330, it is determined that record 4 represents a response record associated with record 3 because, in part, the destination port field of record 4 matches the source port field of record 3. Therefore, at step 338, record 4 is added to response list 254. At step 360, the destination port field of record 4 is set to "80", the destination port field of record 3. Likewise, for record 6, it is determined that record 6 is a response associated with record 5. Therefore, at step 338, record 6 is added to response list 254. At step 360, the destination port field of record 6 is set to "80", the destination port field of record 5.

After record 7 is selected, at block 310 is determined that the destination port of record 7 is a key port. At block 324, it is determined that flow record 7 is a request record. Therefore, record 7 is added to request list 252.

At block 310, it is determined that the destination addresses of flow records 8, 9, 10, and 11 are not key ports. At block 330 it is determined that flow records 8, 9, 10, 11 are not matching response records. Therfore they are added to the unknown list 256.

Referring to 4A, at block 404, the first record selected is flow record 1. At block 420, it is determined that there are no other flow records in request list 252 that have a matching source device field, source port field, and destination device field.

The next record selected is record 3. Because at block 420, it determined that record 1 and record 3 have a matching source device field, destination port field, and destination device field, record 3 is aggregated with record 1. Likewise, the next record selected, flow record 5, is aggregated with record 1.

Referring to FIG. 4B, at block 454, the first record selected is flow record 2. At block 470, it is determined that there are no other flow records in response list 254 that have a matching source device field, destination port field, and destination device field.

The next record selected is record 4. At block 470, it is determined that record 2 and record 4 have a matching source device fields, destination port fields, and destination device field, therefore, record 4 is aggregated with record 2. Likewise, the next record selected, flow record 6, is aggregated with record 2.

Table 630 shows the tables that remain in request list 252, response list 254, and unknown list 256. Flow record 1 in table 630 has been aggregated with record 3 and 5, and flow record 2 has been aggregated with records 4 and 6.

The process of FIG. 5, shall now be illustrated.

At block 520, record 8 is selected. At block 530, it is determined that destination port field in the selected record 8 does not specify a key port in key port list 280. Control returns to block 510. At block 520, record 9 is selected.

At block 530, it determined that record 9 specifies a key port, that is, key port 80. However, at block 540, it is determined that there is not a processed record in unknown list 256 with a matching source device field, destination device field, source port field, and destination port field. Control returns to block 610. Execution proceeds until record 11 is selected.

At block 530, it is determined that record 11 matches the source device field, destination device field, source port field, and destination port field of processed record 9. At block 550, record 11 is aggregated with record 9. At block 560, record 11 is removed from response list 256.

After aggregating the flow records in the manner described, response records associated with a particular type of traffic between a set of devices are aggregated into fewer fields. While this may render the source port field ambiguous, typically tracking such information is not meaningful because the source ports for typical requests are assigned arbitrarily anyway. Thus, tracking traffic at a level of detail that includes source device field as an aggregate field may be less meaningful.

In addition, response records associated with a particular type of request flow are aggregated according to the type of network traffic associated with the request flow. Thus, response flows generated in response to request flows are associated to those request flows. Likewise, the source device for a response flow may be assigned arbitrarily, for example, due to port switching. Accordingly, the source device field of a flow record is ignored during aggregation.

Flow records representing flow between ports that are not key ports are not aggregated. Typically, flow between non key ports represents network traffic of an unestablished network traffic type, a type of network traffic for which greater detail may be needed for purposes of network management. For example, retaining information at this level of detail captures values for EARLIESTTIME and LATESTTIME associated with each raw flow record generated by a switching mechanism. Such information may be useful for security purposes.

Techniques for aggregation have been illustrated by aggregating raw flow records into aggregation records that have the same fields as the raw flow records. However, techniques for aggregation are not limited to any particular type of flow record, and to aggregation of flow records that contain identical fields. In addition, aggregation of request records and response records have been illustrated using matching aggregation keys that include a source device field, destination device field, and destination port. However, aggregation keys may include other fields, such as the protocol field.

HARDWARE OVERVIEW

Figure 7:
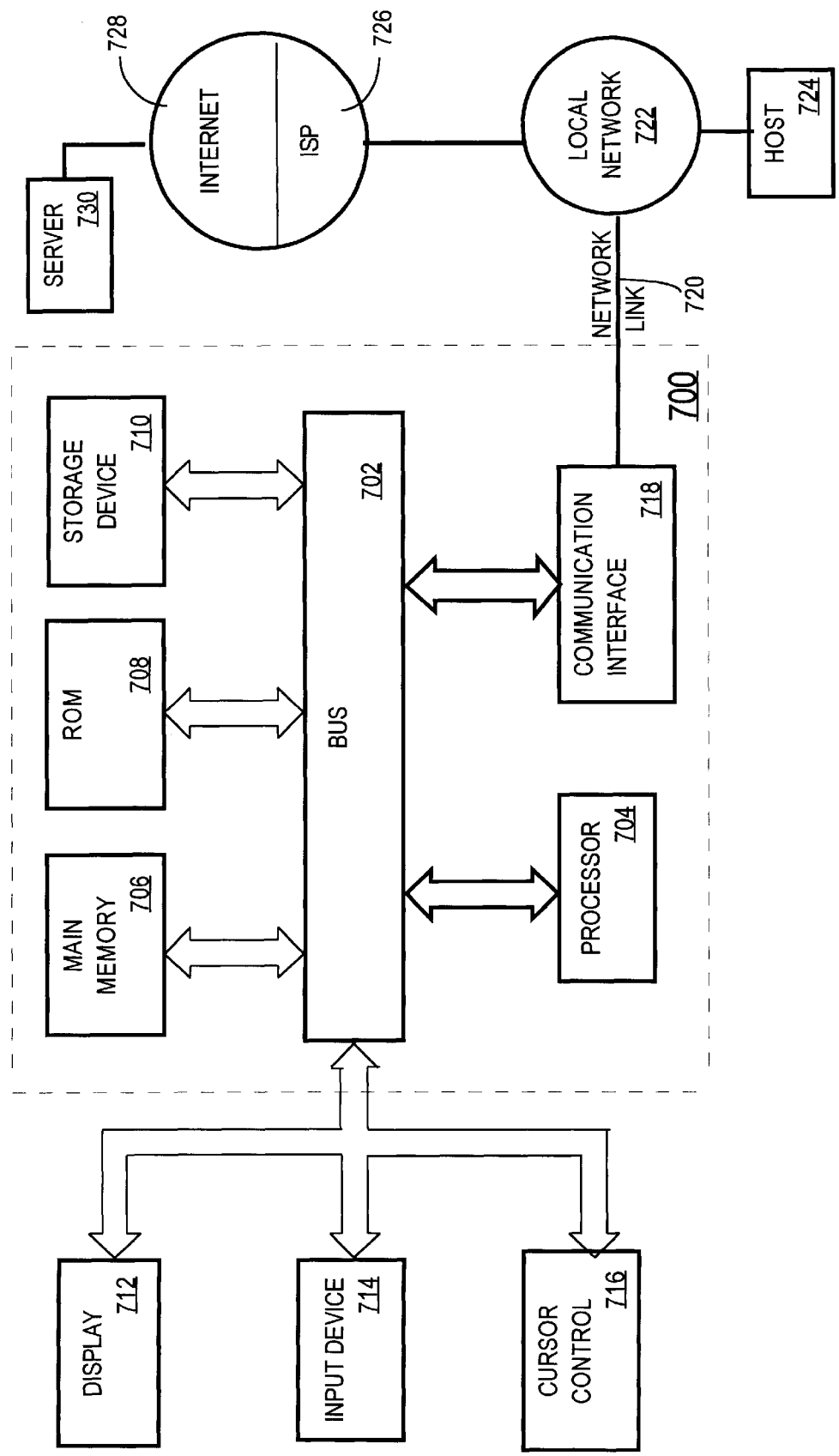
FIG. 7 is an exemplary computer upon which a flow collector may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for aggregating network information. According to one embodiment of the invention, aggregating network information is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process blocks described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for aggregating network information as described herein.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of aggregating multiple flow records that each describe at least one message communicated among nodes of a network, the method comprising the steps of:

selecting a first plurality of flow records from among said multiple flow records that satisfy a first set of criteria;

selecting a second plurality of flow records from among said multiple flow records that satisfy a second set of criteria;

creating and storing information that establishes each flow record from said second plurality of flow records as representative of network flow which is responsive to network flow that is represented by the first plurality of flow records;

aggregating at least two records from said second plurality of flow records that reflect network flow of a particular type from a first node to a second node;

wherein the step of selecting a first plurality of flow records from among said multiple flow records includes selecting at least one flow record that represents a given network flow from a given source device and given port to a given destination device; and wherein the step of selecting a second plurality of flow records from among said multiple flow records that satisfy a second set of criteria includes the step of determining whether a particular flow record represents a network flow to the given source device and given port from the given destination.

2. The method of claim 1, wherein the step of selecting a second plurality of flow records includes selecting a first record that represents a particular network flow responsive to another network flow that is represented by a subset of flow records from said first plurality of flow records and is associated with a given type of network flow; and wherein the step of creating and storing information that establishes includes the step of associating said first record with said given type of network flow.

3. The method of claim, 2, wherein said subset of flow records specify a destination port; and wherein the step of associating said first record with said given type of network flow includes updating said first record to specify said destination port.

4. The method of claim 3, further including the step of aggregating records in said second plurality of flow records that are associated with the same source device, destination device, and type of network flow.

5. The method of claim 1, wherein the step of selecting a first plurality of flow records from among said multiple flow records that satisfy a first set of criteria includes selecting a set of flow records that satisfy a first set of criteria that includes that a flow record reflect traffic that is associated with at least one type from a set of network flow types.

6. The method of claim 5, wherein the step of selecting a set of flow records that satisfy a first set of criteria includes that the flow record reflect network traffic to at least one port of a set of ports.

7. The method of claim 1, wherein the step of aggregating at least two records includes aggregating at least two records from the second plurality of flow records that each represent a network flow from the particular network device to the other network device at a particular port.

8. The method of claim 1, further including the step of aggregating at least two records from said first plurality of flow records that reflect network flow of the particular type to the particular network device from the other network device.

9. The method of claim 1, further including the step of selecting a third plurality of flow records that each:

do not satisfy the first set of criteria, and when selected as a member of the third plurality of flow records, do not satisfy the second set of criteria.

10. The method of claim 1, wherein said particular flow record specifies a quantity of data.

11. A computer-readable medium carrying one or more sequences of one or more instructions for aggregating multiple flow records that each describe at least one message communicated among nodes of a network, the one or more sequences of one or more instructions including instructions which, when executed by one or more processors, cause the one or more processors to perform the steps of:

selecting a first plurality of flow records from among said multiple flow records that satisfy a first set of criteria;

selecting a second plurality of flow records from among said multiple flow records that satisfy a second set of criteria;

creating and storing information that establishes each flow record from said second plurality of flow records as representative of network flow which is responsive to network flow that is represented by the first plurality of flow records;

aggregating at least two records from said second plurality of flow records that reflect network flow of a particular type from a first node to a second node;

wherein the step of selecting a first plurality of flow records from among said multiple flow records includes selecting at least one flow record that represents a given network flow from a given source device and given port to a given destination device; and wherein the step of selecting a second plurality of flow records from among said multiple flow records that satisfy a second set of criteria includes the step of determining whether a particular flow record represents a network flow to the given source device and given port from the given destination.

12. The computer-readable medium of claim 11, further including sequences of instructions for performing the step of aggregating at least two records from said first plurality of flow records that reflect network flow of the particular type to the particular network device from the other network device.

13. The computer-readable medium of claim 12, further including the step of selecting a third plurality of flow records that each:

do not satisfy the first set of criteria, and when selected as a member of the third plurality of flow records, do not satisfy the second set of criteria.

14. The computer-readable medium of claim 13, wherein the step of selecting a first plurality of flow records from among said multiple flow records includes selecting at least one flow record that represents a given network flow from a given source device and given port to a given destination device; and wherein the step of selecting a second plurality of flow records from among said multiple flow records that satisfy a second set of criteria includes the step of determining whether a particular flow record represents a network flow to the given source device and given port from the given destination.

15. A flow collector for aggregating multiple flow records that each describe at least one message communicated among nodes of a network, said flow collector comprising:

an aggregator;

said aggregator configured to select a first plurality of flow records from among said multiple flow records that satisfy a first set of criteria;

said aggregator configured to select a second plurality of flow records from among said multiple flow records that satisfy a second set of criteria;

said aggregator configured to create and store information that establishes each flow record from the second plurality of flow records as representative of network flow which is responsive to network flow that is represented by the first plurality of flow records;

said aggregator configured to aggregate at least two records from said second plurality of flow records that reflect network flow of a particular type from a first node to a second node;

said aggregator configured to select a first plurality of flow records from among said multiple flow records by performing one or more steps that include selecting at least one flow record that represents a given network flow from a given source device and given port to a given destination device; and said aggregator configured to select a second plurality of flow records from among said multiple flow records that satisfy a second set of criteria by performing one or more steps that include the step of determining whether a particular flow record represents a network flow to the given source device and given port from the given destination.

16. The apparatus of claim 15, further comprising said aggregator configured to aggregate at least two records from said first plurality of flow records that reflect network flow of the particular type to the particular network device from the other network device.

17. The apparatus of claim 15, further comprising said aggregator configured to select a third plurality of flow records that each:

do not satisfy the first set of criteria, and when selected as a member of the third plurality of flow records, do not satisfy the second set of criteria.

18. A method for aggregating flow records that describe messages communicated among nodes of a network, the method comprising the steps of:

organizing raw flow records into stage flow records according to time intervals specified by configuration data;

generating a request list that includes as request records a set of stage flow records that each represent network flow from a particular source device and a particular source port to a particular destination device and a particular destination port that is specified by a key ports list;

generating a response list that includes as response records a set of stage flow records that represent network flow responsive to the request records, wherein each response record corresponds to one or more request records in the request list, wherein each response record represents a network flow to a destination device and a destination port that respectively match the particular source device and the particular source port represented by the one or more request records corresponding to the response record;

updating one or more of the response records to establish as the destination port represented by each of the updated response records, the destination port represented by the one or more request records that correspond to the updated response record;

generating aggregate records that reflect network flow of a particular type from a first node to a second node and that aggregate the request records according to the particular source device, the particular destination device, and the particular destination port represented by each request record, and the response records according to the particular source device, the particular destination device, and the particular destination port represented by each request record.

19. A flow collector for aggregating flow records that describe messages communicated among nodes of a network, the flow collector comprising:

a staging mechanism;

an aggregator;

raw flow records;

configuration data;

a key ports list;

a request list;

a response list;

the staging mechanism configured to organize raw flow records into stage flow records according to time intervals specified by the configuration data;

the aggregator configured to place in the request list as request records a set of stage flow records that each represent network flow from a particular source device and a particular source port to a particular destination device and a particular destination port that is specified by the key ports list;

the aggregator configured to place in the response list as response records a set of stage flow records that represent network flow responsive to the request records, wherein each response record corresponds to one or more request records in the request list, wherein each response record represents a network flow to a destination device and a destination port that respectively match the particular source device and the particular source port represented by the one or more request records corresponding to the response record;

the aggregator configured to update one or more of the response records to establish as the destination port represented by each of the updated response records, the destination port represented by the one or more request records that correspond to the updated response record; and the aggregator configured to generate aggregate records by
aggregating the request records according to the particular source device, the particular destination device, and the particular destination port represented by each request record, and
aggregating the response records according to the particular source device, the particular destination device, and the particular destination port represented by each request record.

20. A computer-readable medium carrying one or more sequences of one or more instructions for aggregating flow records that describe messages communicated among nodes of a network, the one or more sequences of one or more instructions including instructions which, when executed by one or more processors, cause the one or more processors to perform the steps of:

organizing raw flow records into stage flow records according to time intervals specified by configuration data;

generating a request list that includes as request records a set of stage flow records that each represent network flow from a particular source device to a particular destination device and a particular destination port that is specified by a key ports list;

generating a response list that includes as response records a set of stage flow records that represent network flow responsive to the request records, wherein each response record corresponds to one or more request records in the request list, wherein each response record represents a network flow to a source device and a source port that respectively match the particular destination device and the particular destination port represented by the one or more request records corresponding to the response record;

updating one or more of the response record to establish as the destination port represented by each of the updated response records, the destination port represented by the one or more request records that correspond to the updated response record;

generating aggregate records that reflect network flow of a particular type from a first node to a second node and that aggregate the request records according to the particular source device, the particular destination device, and the particular destination port represented by each request record, and
the response records according to the particular source device, the particular destination device, and the particular destination port represented by each request record.

* * * * *

UNITED STATES PATENT AND TRADEMARK OFFICE
CERTIFICATE OF CORRECTION

PATENT NO. : 6,546,420 B1
DATED : April 8, 2003
INVENTOR(S) : Christian Lemler et al.

It is certified that error appears in the above-identified patent and that said Letters Patent is hereby corrected as shown below:

Column 18, lines 65-66 thru Column 19, lines 1-4,
Delete "raw flow records; configuation data; a key ports list; a request list; a response list;"

Column 19,
Line 6, delete "the";
Line 19, delete "7" replace "the" with -- a --;
Line 13, replace "the" with -- a --.

Signed and Sealed this

Fourteenth Day of December, 2004

JON W. DUDAS
*Director of the United States Patent and Trademark Office*